A. T. COLLIER.
APPARATUS FOR CUTTING GLOBOID WORMS.
APPLICATION FILED SEPT. 19, 1907.

921,593.

Patented May 11, 1909.

A. T. COLLIER.
APPARATUS FOR CUTTING GLOBOID WORMS.
APPLICATION FILED SEPT. 19, 1907.
921,593.
Patented May 11, 1909.
4 SHEETS—SHEET 4.
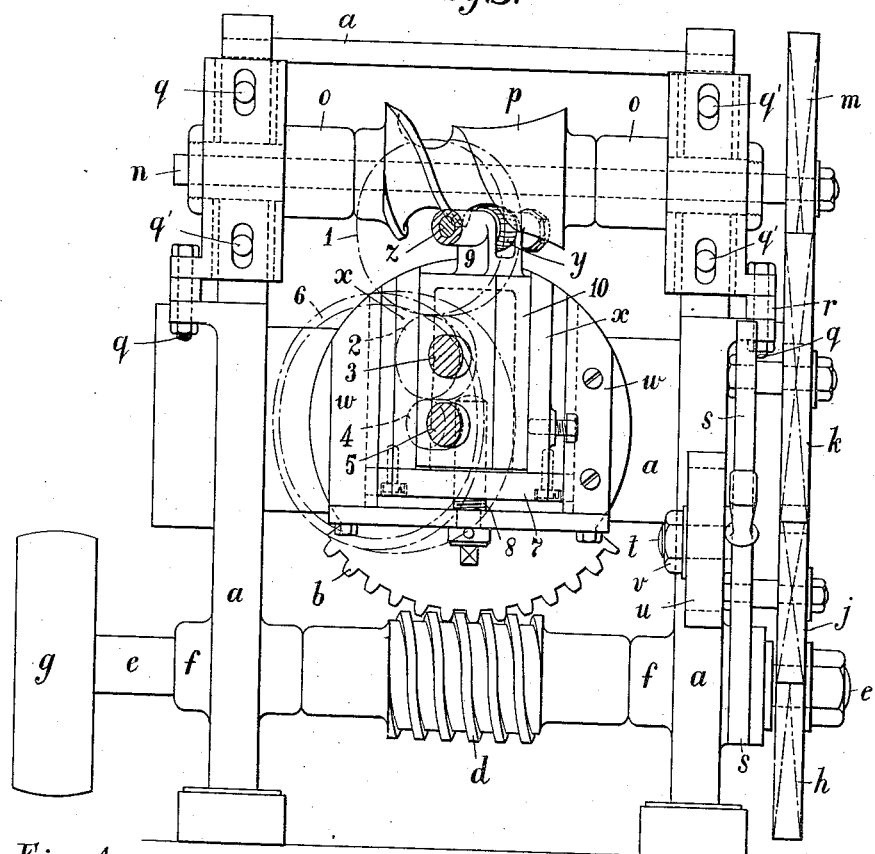
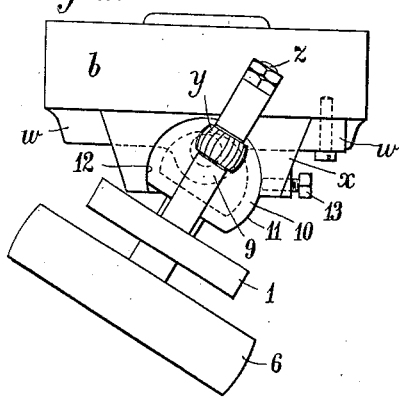
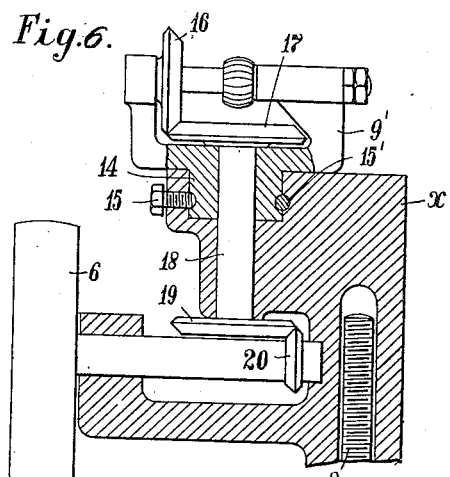

UNITED STATES PATENT OFFICE.

ARTHUR THOMAS COLLIER, OF ST. ALBANS, ENGLAND, ASSIGNOR OF ONE-FIFTH TO HARRY SEYMOUR FOSTER, OF LONDON, ENGLAND.

APPARATUS FOR CUTTING GLOBOID WORMS.

No. 921,593.

Specification of Letters Patent.     Patented May 11, 1909.

Application filed September 19, 1907. Serial No. 393,681.

*To all whom it may concern:*

Be it known that I, ARTHUR THOMAS COLLIER, a subject of the King of Great Britain, residing at St. Albans, England, have invented certain new and useful Improvements in Apparatus for Cutting Globoid Worms, of which the following is a specification.

This invention relates to apparatus for cutting globoid worms of the kind wherein there is a frame in which a worm blank shaft is rotatably mounted and is connected by gearing to a pivotally-mounted tool carriage, the latter bearing a rotary cutter tool to act upon the blank on the worm blank shaft.

According to the present invention, the cutter or tool for acting on the blank is mounted upon the tool carriage in such manner that the axis of rotation is arranged in a direction corresponding substantially to the angle of the thread to be cut, means being provided if desired for adjusting such angle to permit threads of different angles to be produced.

Figure 1:
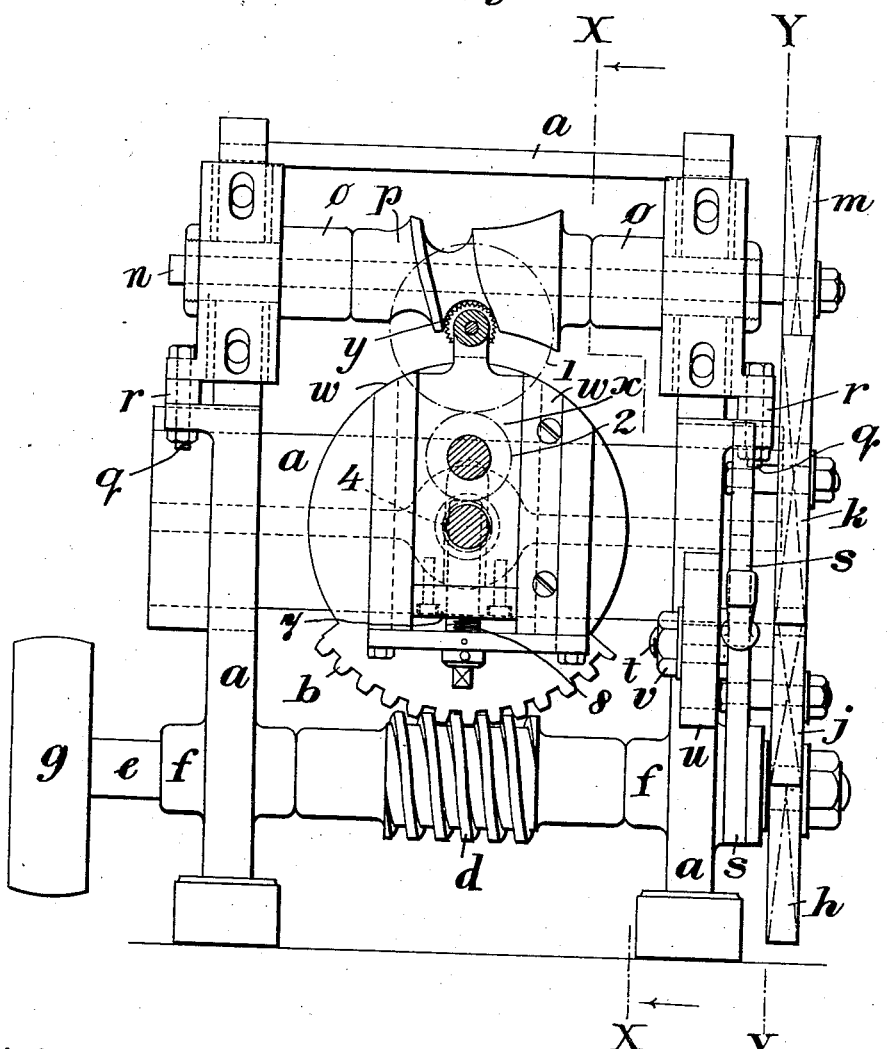
Figure 2:
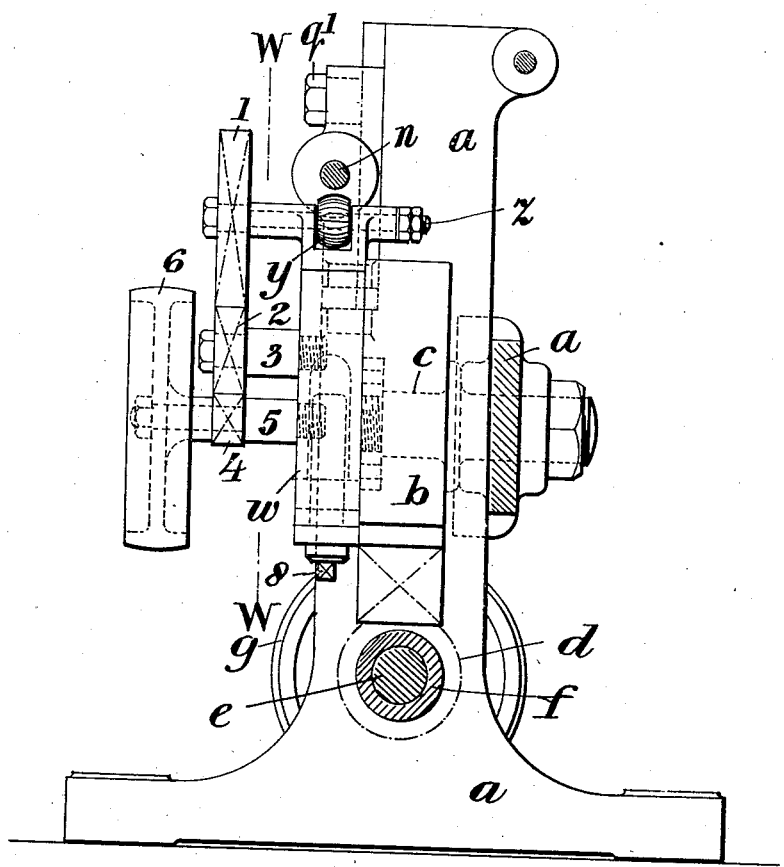
Figure 3:
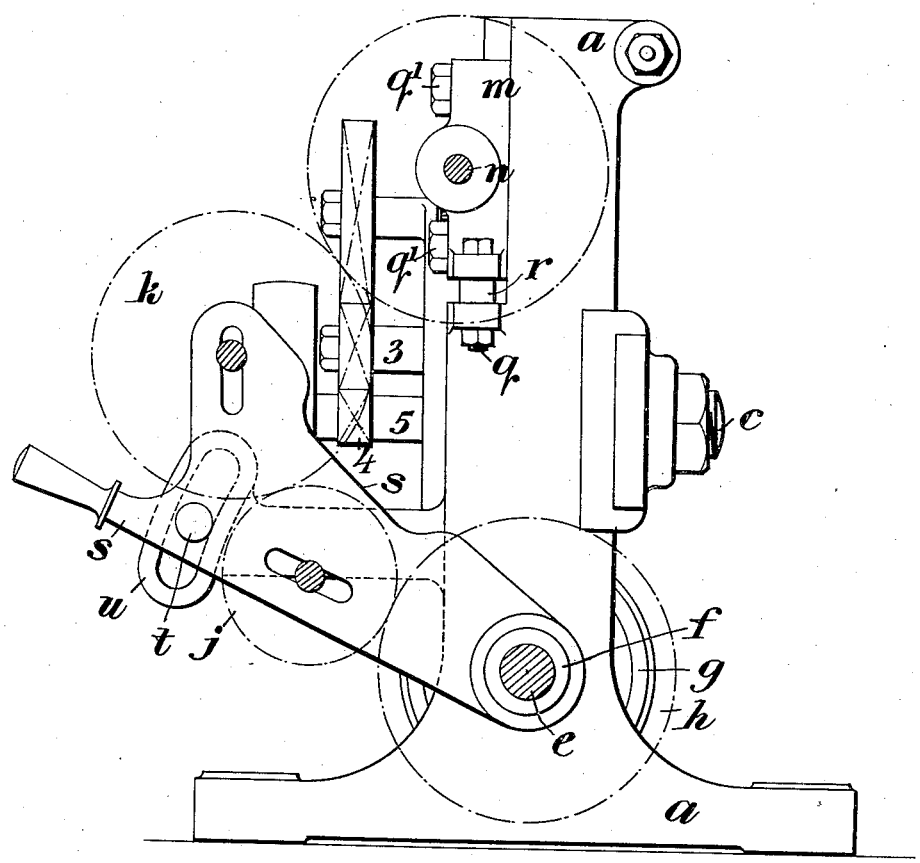

In the accompanying drawings:—Figure 1 is a front elevation, partly in section on the line W, W, Fig. 2; Fig. 2 a section on the line X, X, Fig. 1, with the worm-blank removed; and Fig. 3 an end elevation, partly in section on the line Y, Y, Fig. 1, showing a machine constructed according to my said invention. Fig. 4 is a plan view of a portion of a gear cutting machine wherein the cutter spindle is adjustable according to the angle of the thread to be cut; Fig. 5 is a front elevation of a complete machine embodying the adjustable mounting for the cutter spindle as shown in Fig. 4. Fig. 6 is a sectional view of another manner of mounting the cutter spindle whereby the latter may be set at different angles.

Like letters indicate corresponding parts throughout the drawings.

$a$ is the frame of the machine; $b$ is a segmental worm-wheel which is rotatably mounted on a stud-shaft $c$ and gears with a worm $d$. This worm, which should be accurately cut and which may be termed the "master-worm," is mounted on a shaft $e$ turning in bearings $f, f$ in the frame $a$ and provided with a pulley $g$ whereby it may be conveniently turned. If desired, a globoid worm may be employed as a master worm. The shaft $e$ is connected by spur gearing $h, j, k, m$ to a shaft $n$ which rotates in bearings $o, o$ on the frame $a$ and to which is fixed the worm-blank $p$. The bearings $o, o$ are adjustably mounted on the frame $a$ and are secured in position by means of bolts $q, q$, set-screws $q', q'$ and distance-pieces $r, r$. The stud-shafts of the spur-wheels $j, k$ are adjustably supported on a frame $s$ which is pivotally mounted on the boss of one of the bearings $f$ and is provided with a stud $t$ moving in an arc shaped slot in a bracket $u$ on the frame $a$, the said stud being fitted with a clamping nut $v$ whereby the frame $s$ can be secured in any desired position. By changing one or more of the gear-wheels $h, j, k, m$, or by replacing the gear-wheels $j, k$ by a single wheel, the speed of the shaft $n$ can be increased or diminished or its direction of rotation can be reversed relatively to the shaft $e$. Thus if the train connecting the shafts $e, n$ comprises an even number of wheels, the thread cut on the blank will be in the same direction as that on the master-worm; if however said train comprises an odd or uneven number of wheels, the thread cut will be in the opposite direction to that of the master-worm. By this means either a right or a left-handed thread can be cut from one master-worm whether the latter be of right- or left-handed thread.

By rotating the two worm shafts at the same speed in an appropriate manner, and arranging the rotary cutter on the pitch line of the worm wheel or segment, a globoid worm will be cut having the same pitch as the master worm. If, however, the rotary cutter is arranged at a greater radius than that of the pitch circle of the worm wheel or segment, a globoid worm will be cut of proportionately coarser pitch than that of the master worm. Should the rotary cutter be arranged at a smaller radius than that of the pitch circle of the worm wheel or segment, the pitch of the globoid worm cut will be less than that of the master worm so that any inaccuracies in the latter will be correspondingly diminished. Should the worm shafts be rotated at different speeds, the pitch of the globoid worm will be varied in inverse proportion to the speed of the shaft supporting the blank. By this means, it is possible to cut globoid worms of any desired number of threads using the same master worm. Thus, if the blank rotates at half the speed of the master worm and should the rotary cutter be arranged on the pitch circle of the worm wheel or segment, the thread cut on the blank will have a pitch double that of the master worm. By returning the parts to their initial position and then moving the cutter and worm wheel or segment, or the cutter only, relatively to the master worm and the blank through an angle corresponding to the pitch of the master worm, a second thread can be cut in the space between the convolutions of the thread first cut. By maintaining the radius of oscillation of the rotary cutter constant, and rotating the blank at half, one-third and one-quarter the speed of the master worm, respectively, a series of globoid worms can be cut which will all gear with the same worm wheel.

On the worm-wheel b are provided guides w, w between which moves a slide x that is forked at its outer end to receive a rotary cutter y mounted on a spindle z turning in suitable bearings in the limbs of said fork.

This spindle z bears a gear-wheel 1 that gears with a gear-wheel 2 which is mounted on a stud-shaft 3 on the slide x and gears with a gear-wheel 4 which is also mounted on a stud-shaft 5 on the slide x and is provided with a belt-pulley 6 whereby rotary motion may be imparted to the cutter y through the gear-wheels 1, 2, 4. The slide x is provided with a nut 7 coacting with a leading screw 8 rotatably mounted on the worm-wheel b, so as to enable the distance of the cutter from the axis of the worm-wheel to be varied as desired. The stud-shaft 5 is preferably arranged as shown so that, when in its mid-position, it is substantially coaxial with the worm-wheel b. By this means, variation in the distance of the center of the pulley 6 from the center of the driving pulley (not shown) during the rotation of the worm-wheel b will be reduced to a minimum.

The operation of my improved machine is as follows:—The velocity-ratio of the shafts e, n is adjusted to the required value by suitable selection of gear-wheels h, j, k, m and the milling cutter y is set to the required radius by means of the leading screw 8. Rotary motion is then imparted, e. g. by means of the pulleys g, 6, at the required speeds, to the worm d and cutter y, so that the cutter y will move in the required curvilinear path at such a rate as to form a thread or threads of the desired pitch on the blank p. The thread-groove may be cut to the required depth at one passage of the cutter y along the blank, or it may be arranged to pass twice or oftener along said blank for this purpose. After the thread-groove or grooves is or are cut to the required depth, the rotary cutter can be replaced by a rotary polishing bob or other device for polishing the surface of the globoid worm, for example, in cases where it is desired to use the worm with worm-wheels having rotary ball or roller teeth.

The worm-shafts e, n and worm-segment b may be rotated in any other suitable manner, for example, by means of a weighted cord wound on a drum mounted on one of the shafts, or by means of a spring. They may however be rotated by spur- or other positive gearing. The rotary cutter instead of being driven through gearing 1, 2, 4 as shown may be driven directly by a belt arranged in such a position and with its driving pulley at such a distance from the said cutter that the spring of the belt will be sufficient to compensate for the variation in the distance between the axes of the driving pulley and of the cutter during the travel of said cutter. In the case where the globoid worm is to work with a worm-wheel having roller-teeth, the cutter will be made of corresponding form to the rollers employed.

Fig. 4 shows means for mounting the cutter spindle whereby the latter is adapted to cut worms in which the thread or threads is or are of very long pitch, the angle of the thread in this instance departing considerably from a right angle to the axis of the worm. In this arrangement the stud shafts 3 and 5 and the fork 9 in which the cutter spindle z is journaled are mounted on an auxiliary frame 10 which has an arc-shaped surface 11 fitting into a correspondingly shaped seat or guide 12 on the slide x, the axis of said arc-shaped surface preferably extending through the center of the ball-shaped cutter y, and suitable means, such as a set screw 13 is provided for securing the auxiliary frame 10 in such a position that the axis of rotation of the cutter y stands at or substantially at the angle of the thread relatively to the axis of the worm, so that the spindle z and its bearings will clear the cut thread or threads.

Fig. 5 shows a machine of the same type as illustrated in Fig. 1 of the drawings, the adjustable mounting for the spindle being applied thereto.

Fig. 6 illustrates another mounting whereby the angle of the cutter spindle may be adjusted. In this instance, only the fork 9' carrying the bearing arms of the spindle z is adjustable, and for this reason it is mounted on a sleeve 14 which is turnable in a cylindrical recess formed in the top of the slide x. This sleeve is provided with an annular groove which engages on one side with a set-screw 15 and on the other side with a tangentially arranged pin 15', the latter permitting rotary but preventing axial movement of the sleeve. In this construction the sleeve 14 and the fork 9' are turnable about an axis extending through the center of the worm, and the set-screw 15 serves to lock the sleeve and consequently the spindle thereon at any desired angle. The spindle z in this case is provided with a bevel wheel 16 gearing with another bevel wheel 17 fixed on a shaft 18, the latter extending axially of the sleeve 14 and hence the shaft 18 and its coöperating parts may rotate about the same axis as that about which the fork 9' turns, the intermediate shaft being rotated through the medium of another pair of bevel wheels 19 and 20, the latter being driven by a belt-wheel or its equivalent 6. In some cases, moreover, the segmental-worm wheel $b$ and worm $d$ may be replaced by bevel-, spur- or other suitable gearing.

The shafts $e, n$ may be provided with ball or other suitable bearings to take the end thrust from the worms.

In cases where the parallel shafts and worm-wheel are driven by a weight or spring, a suitable stop or rest can be provided for arresting the motion of the train when the thread being cut is finished.

What I claim is:—

1. A machine for cutting globoid worms, said machine comprising a frame, a worm-wheel rotatably mounted in said frame, a worm rotatably mounted in said frame and gearing with said worm-wheel, a blank-shaft, a rotary cutter-spindle, bearings for said cutter-spindle, a frame supporting said bearings and provided with arc-shaped surfaces, a corresponding arc-shaped seat supported on said worm-wheel and coacting with the arc-shaped surfaces on said frame, means for clamping said frame in said seat, gearing connecting said blank-shaft and said worm, and means for rotating said worm.

2. A machine for cutting globoid worms, said machine comprising a frame, a worm blank shaft rotatably mounted in said frame, a tool carriage pivotally mounted in said frame, a tool rotatably mounted in said tool carriage in position for acting on a worm blank on said shaft, means for adjusting the angle of the axis of said tool relatively to said tool carriage, and gearing connecting said worm blank shaft and said tool carriage.

In testimony whereof I have hereunto set my hand in presence of two subscribing witnesses.

ARTHUR THOMAS COLLIER.

Witnesses:
  GEO. HARRISON,
  CONRAD K. VALKENSTEIN.